(12) United States Patent
Perlman

(10) Patent No.: US 10,278,405 B2
(45) Date of Patent: *May 7, 2019

(54) PAR-BAKED COFFEE BEAN COMPOSITIONS FOR USE IN ANTIOXIDANT-CONTAINING PRODUCTS

(71) Applicant: Brandeis University, Waltham, MA (US)

(72) Inventor: Daniel Perlman, Arlington, MA (US)

(73) Assignee: Brandeis University, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,681

(22) Filed: Mar. 8, 2018

(65) Prior Publication Data

US 2018/0192664 A1 Jul. 12, 2018

Related U.S. Application Data

(60) Continuation of application No. 14/955,165, filed on Dec. 1, 2015, now Pat. No. 9,936,717, which is a division of application No. 13/946,583, filed on Jul. 19, 2013, now Pat. No. 9,210,948.

(51) Int. Cl.
```
A23F 5/02      (2006.01)
A23F 5/04      (2006.01)
A23L 2/52      (2006.01)
A23L 33/105    (2016.01)
```

(52) U.S. Cl.
CPC ............... *A23F 5/02* (2013.01); *A23F 5/04* (2013.01); *A23L 2/52* (2013.01); *A23L 33/105* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 116,298 A | 6/1871 | Gilles | |
| 2,497,501 A | 2/1950 | Himmel | |
| 3,700,464 A | 10/1972 | Patel et al. | |
| 3,989,850 A | 11/1976 | Erb et al. | |
| 4,256,774 A | 3/1981 | Strobel et al. | |
| 4,501,761 A | 2/1985 | Mahlmann et al. | |
| 4,637,935 A | 1/1987 | Kirkpatrick et al. | |
| 4,737,376 A | 4/1988 | Brandlein et al. | |
| 4,857,351 A | 8/1989 | Neilson et al. | |
| 4,872,987 A * | 10/1989 | Kopsch et al. | ............... 210/635 |
| 5,132,134 A | 7/1992 | Nini et al. | |
| 5,725,898 A | 3/1998 | Murphy et al. | |
| 5,888,549 A | 3/1999 | Buchholz et al. | |
| 6,495,180 B1 | 12/2002 | Gurol | |
| 8,455,019 B2 | 6/2013 | Milo et al. | |
| 8,784,925 B2 * | 7/2014 | Shigeno et al. | ............... 426/594 |
| 2005/0132893 A1 | 6/2005 | Arora et al. | |
| 2008/0113077 A1 | 5/2008 | Leloup et al. | |
| 2009/0053382 A1 | 2/2009 | Kawamura et al. | |
| 2009/0092736 A1 | 4/2009 | Koyama et al. | |
| 2011/0091610 A1 | 4/2011 | Robinson et al. | |
| 2011/0189313 A1 | 8/2011 | Shimoda et al. | |
| 2011/0305792 A1 | 12/2011 | Vella et al. | |
| 2012/0251678 A1 | 10/2012 | Leloup et al. | |

FOREIGN PATENT DOCUMENTS

| | | |
|---|---|---|
| CA | 1099579 A | 4/1981 |
| EP | 0405649 A2 | 1/1991 |
| WO | WO2011/134656 A1 | 11/2011 |

OTHER PUBLICATIONS

U.S. Appl. No. 13/946,583, filed Jul. 19, 2013, Daniel Perlman.
U.S. Appl. No. 14/955,165, filed Dec. 1, 2015, Daniel Perlman.
Pittia et al. "Textural Changes of Coffee Beans as Affected by Roasting Conditions," Lebensm.-Wiss. u.-Technol., vol. 34, pp. 168-175 (2001).
Moon et al., "Role of Roasting Conditions in the Level of Chlorogenic Acid Content in Coffee Beans: Correlation with Coffee Acidity," J. Agric. Food Chem., vol. 57, pp. 5365-5369 (2009).
Darmady et al., "Sterilization by dry heat," J. Clin. Pathol., vol. 14, pp. 38-44 (1961).
Lokker, "Coffee Roasts From Light to Dark," Mar. 11, 2013, www.coffeecrossroads.com/coffee-101/coffee-roasts-from-light-to-dark, pp. 1-6.
www.coffeesearch.org/coffee/roasting.htm, pp. 1-7, 2001-2006.

* cited by examiner

*Primary Examiner* — Tamra L. Dicus

(57) ABSTRACT

The present invention concerns compositions and methods relating to the addition and use of par-baked and milled coffee beans in food products, beverages, and dietary supplements. Par-baked and milled coffee beans are a novel alternative to more costly chlorogenic acid extracts, and are edible and palatable as a food ingredient. The ingredient is prepared from the entire *Coffea robusta* or *arabica* green coffee bean and provides substantially increased amounts of dietary chlorogenic acid antioxidants compared to roasted beans. When the green coffee bean is appropriately par-baked at a temperature significantly lower than coffee roasting temperatures, the bean retains significant moisture, yet becomes embrittled, enabling milling to produce fine and beneficially hydrophilic particles, without any significant loss of bioactive chlorogenic acid and without significant pyrolysis occurring. As described herein, the par-baked coffee bean is superior to both the green coffee bean and the traditionally roasted coffee bean for adding chlorogenic acids to foods, beverages and dietary supplements.

19 Claims, No Drawings

PAR-BAKED COFFEE BEAN COMPOSITIONS FOR USE IN ANTIOXIDANT-CONTAINING PRODUCTS

CROSS REFERENCE TO RELATED APPLICATIONS

This is a continuation of Ser. No. 14/955,165, filed on Dec. 1, 2015, which is a divisional application of U.S. application Ser. No. 13/946,583, filed on Jul. 19, 2013, both of which are hereby incorporated by reference in their entirety.

BACKGROUND

Coffee beans are generally roasted, milled, and brewed with hot water to produce a beverage that is valued for its flavor and aroma characteristics as well as for its caffeine content, the latter of which helps the coffee drinker remain awake and alert. Flavor, aroma and color are developed in coffee beans in the course of a roasting process at temperatures typically exceeding 230 degrees Celsius (approximately 450 degrees Fahrenheit). The least (lightest) roasted coffee is generally considered to be the so-called "cinnamon roast" in which the coffee bean is exposed to a temperature of approximately 390° F. and where the internal temperature of the beans reaches approximately 196° C. (385° F.). It is understood that to be considered cinnamon roasted coffee, the bean temperature should not reach 400° F. A complex group of chemical reactions involving proteins and carbohydrates occur during roasting. These reactions are largely responsible for flavor and color development, and are known as the Maillard reactions.

While roasted coffee beans are occasionally consumed in a food or beverage, e.g., incorporated as whole beans into chocolate candies or powdered and imbibed in Turkish coffees, green coffee beans are not generally eaten. That is because green coffee beans are too tough to be masticated, and even when milled into small particles, green coffee beans have a somewhat unpleasant and raw bean-like flavor. Nevertheless, Vella et al., in Published U.S. Pat. Appl. No. 2011/0305792A1, suggest that milled green coffee beans can be ingested, primarily as a dietary supplement. Green coffee beans naturally contain high levels of a group of water-soluble phenolic antioxidants known as chlorogenic acids (collectively abbreviated "CGA"). The CGA antioxidants are believed to provide significant health benefits when consumed on a regular basis. CGA antioxidant levels in green coffee beans typically range between approximately 5% and 10% by weight of the beans. Coffee beans of the species *Coffea robusta* generally contain somewhat higher levels of CGA than beans of the species *Coffea arabica*. As many as nine or more different molecular isomers of CGA constitute a family of antioxidants (Moon et al., J. Agric. Food Chem. 2009, 57, 5365-5369). The principal members of this family include the caffeoylquinic acids, dicaffeoylquinic acids and feruloylquinic acids. CGA antioxidants are nearly quantitatively released from milled coffee beans during the brewing of coffee with hot water. However, roasting of coffee beans is known to degrade CGA.

To preserve and provide higher CGA levels to the consumer, Vella et al., in Published U.S. Pat. Appl. No. 2011/0305792A1 describe a method of processing green coffee beans that avoids significant heating of the beans. Methods for cold-sterilizing, low temperature drying, grinding, stabilizing and packaging green coffee beans as a dietary supplement or food additive are described. Exposure of the product to temperatures exceeding 130° F. (54° C.) for more than a few seconds is avoided, although 12-24 hours of drying at 120° F. is recommended. The resulting milled raw coffee beans are provided as a nutritional supplement in the form of tablets, capsules or as a bulk powder, or as a food additive.

Modified heat treatments that avoid roasting have been devised for preparing improved antioxidant extracts from coffee beans. For example, Leloup et al., in Published U.S. Pat. Appl. No. 2012/0251678A1 describe the importance of avoiding traditional roasting or any other dry heat treatment of green coffee beans or extract. Accordingly, using water and/or steam, Leloup et al. maintain a significant level of moisture, i.e., between 6% and 50% by weight of the beans, and generally cook the coffee beans. Pressure is used to cook the beans at elevated temperatures, e.g., above 100° C. Moist heat processing is understood to preserve CGA levels while allowing subsequent liquid extraction of CGA from the beans without also extracting native proteins having undesirable allergenic properties. The resulting extracts can be used in the preparation of a food or beverage product rich in CGA.

Leloup et al., in Published U.S. Pat. Appl. No. 2008/0113077A1 describe a coffee product that provides a desirable coffee flavor with an increased level of CGA in which the coffee includes 1%-90% by weight unroasted coffee and 99%-10% by weight roasted coffee. The overall CGA content in the mixed coffee product is at least 4% by weight. By comparison, it is indicated that the CGA content of green coffee is reduced as much as about 40-90% during conventional roasting.

Milo et al., in U.S. Pat. No. 8,455,019 describe a food or beverage composition that includes water-soluble coffee solids, including at least 2% arabinogalactans. At least 92% of the coffee solids are unroasted coffee solids. The solids may contain between 12% and 35% CGA. Coffee roasting that is to be avoided is described as dry or almost dry heating of coffee solids or raw green coffee beans before or after their grinding and extraction. The unroasted coffee solids as described by Milo et al., were not subjected to heat treatment at a temperature above 100° C. and a moisture level below 30% by weight. Instead, Milo's unroasted coffee solids are obtained by extraction of green coffee beans in water under pressure, preferably at a temperature above 130° C., 140° C. or even above 150° C.

SUMMARY OF THE INVENTION

The present invention concerns compositions and methods relating to par-baked coffee beans. Specifically, the compositions are derived from green coffee beans that have been heated at a significantly lower temperature than traditionally roasted coffee beans. The resulting par-baked and milled coffee bean compositions have unexpected properties compared with both green coffee beans and roasted coffee beans, such as containing elevated levels of chlorogenic acid antioxidants and being palatable as an ingredient in foods, beverages and dietary supplements.

One aspect of the invention is an edible composition containing comminuted par-baked coffee beans. Prior to comminution, the beans prior have achieved a weight density from about 0.75 to about 1.10 g/cm$^3$ from the par baking process, which is a lower density than that of green coffee beans and a higher density than that of roasted coffee beans. After comminution, the par-baked coffee beans have an average particle size of less than about 0.5 mm.

In different embodiments of the foregoing composition, the beans have a weight density, prior to comminution, of from about 0.85 to about 1.10 g/cm$^3$, or from about 0.90 to about 1.05 g/cm$^3$, or from about 0.95 to about 1.10 g/cm$^3$, or from about 1.00 to about 1.10 g/cm$^3$, or from about 0.95 to about 1.05 g/cm$^3$.

In further embodiments of the composition, the beans have been par-baked in air at a temperature of from about 220° F. to about 360° F., or from about 220° F. to about 250° F., or from about 250° F. to about 280° F., or from about 280° F. to about 310° F., or from about 310° F. to about 340° F., or from about 320° F. to about 360° F. In some embodiments of the composition, the beans have been par-baked for about 6 to about 20 minutes. In some embodiments, the beans have not undergone first crack expansion during par-baking. In some embodiments, the beans have been par-baked in ambient air without substantial addition of water. Embodiments of the composition have a residual free moisture content of less than about 6 wt %, or less than about 5 wt %, or from about 2.1 wt % to about 5.5 wt %, or from about 2.5 wt % to about 5.5 wt %, or from about 2.5 wt % to about 4.5 wt %.

In other embodiments, the composition is comminuted so that at least 90% by weight of the particles have a diameter of less than 0.4 mm, or less than 0.3 mm, or less than 0.2 mm, or less than 0.15 mm.

Further embodiments of the composition are constituted such that a single serving of the composition contains from about 0.1 g to about 10 g of the comminuted coffee beans. Other embodiments further contain a flavoring agent, an aroma agent, and/or a sweetener selected from the group consisting of powdered sugars, granular sugars, sugar alcohols, high intensity sweeteners, and combinations thereof. Yet other embodiments contain as the sweetener a sugar selected from the group consisting of sucrose, fructose, glucose, and combinations thereof, and the sugar is present in an amount from about 5 parts to about 10 parts by weight per 100 parts by weight of the comminuted coffee beans. Certain of the compositions are provided in the form of a tablet, capsule or powder.

Another aspect of the invention is an edible composition containing comminuted par-baked coffee beans. The beans have been par-baked in air at a temperature of from about 220° F. to about 360° F. prior to being comminuted. In certain embodiments of the composition, the beans have been par-baked in air at a temperature of from about 220° F. to about 250° F., or from about 250° F. to about 280° F., or from about 280° F. to about 310° F., or from about 310° F. to about 340° F., or from about 320° F. to about 360° F. In some embodiments of the composition, the beans have been par-baked for about 6 to about 20 minutes.

In different embodiments of the foregoing composition, the beans have a weight density, prior to comminution, of from about 0.75 to about 1.10 or about 1.15 g/cm$^3$, or from about 0.85 to about 1.10 g/cm$^3$, or from about 0.90 to about 1.05 g/cm$^3$, or from about 0.95 to about 1.10 g/cm$^3$, or from about 1.00 to about 1.10 g/cm$^3$, or from about 0.95 to about 1.05 g/cm$^3$.

In certain embodiments, the beans have not undergone first crack expansion during par-baking. In some embodiments, the beans have been par-baked in ambient air without substantial addition of water. Embodiments of the composition have a residual free moisture content of less than 6 wt %, or less than about 5 wt %, or from about 2.1 wt % to about 5.5 wt %, or from about 2.5 wt % to about 5.5 wt %, or from about 2.5 wt % to about 4.5 wt %.

In other embodiments, the composition is comminuted so that the average particle size is less than 0.5 mm, or so that at least 90% by weight of the particles have a diameter of less than 0.4 mm, or less than 0.3 mm, or less than 0.2 mm, or less than 0.15 mm.

Further embodiments of the composition are constituted such that a single serving of the composition contains from about 0.1 g to about 10 g of the comminuted coffee beans. Other embodiments further contain a flavoring agent, an aroma agent, and/or a sweetener selected from the group consisting of powdered sugars, granular sugars, sugar alcohols, high intensity sweeteners, and combinations thereof. Yet other embodiments contain as the sweetener a sugar selected from the group consisting of sucrose, fructose, glucose, and combinations thereof, and the sugar is present in an amount from about 5 parts to about 10 parts by weight per 100 parts by weight of the comminuted coffee beans. Certain of the compositions are provided in the form of a tablet, capsule or powder.

Yet another aspect of the invention is a food or beverage product containing any of the compositions described above.

In another aspect of the invention, the compositions described above are formulated as nutritional supplements.

Still another aspect of the invention is a method of preparing par-baked coffee beans suitable for use as a nutritional supplement or food or beverage additive. The method includes the step of par-baking green coffee beans in air so as to achieve a weight density of the par-baked beans from about 0.75 to about 1.10 or about 1.15 g/cm$^3$. In certain embodiments, the method further includes the step of comminuting the par-baked beans to an average particle size of less than about 0.5 mm. In certain embodiments of the method, the par-baking is carried out in air at a temperature of from about 220° F. to about 360° F. In some embodiments, the par-baking is carried out for about 6 to about 20 minutes. In some embodiments. the par-baking is carried out in ambient air without substantial addition of water. In other embodiments, the par-baked beans have a residual free moisture content of less than about 6 wt %. In some embodiments, the par-baked beans contain from about 5 wt % to about 15 wt % of chlorogenic acids.

Even another aspect of the invention is another method of preparing par-baked coffee beans suitable for use as a nutritional supplement or food or beverage additive. The method includes the step of par-baking green coffee beans in air at a temperature of from about 220° F. to about 360° F. In certain embodiments, the method further includes the step of comminuting the par-baked beans to an average particle size of less than about 0.5 mm. In certain embodiments of the method, the weight density of the par-baked beans is from about 0.75 to about 1.10 or about 1.15 g/cm$^3$. In some embodiments, the par-baking is carried out for about 6 to about 20 minutes. In some embodiments. the par-baking is carried out in ambient air without substantial addition of water. In other embodiments, the par-baked beans have a residual free moisture content of less than about 6 wt %. In some embodiments, the par-baked beans contain from about 5 wt % to about 15 wt % of chlorogenic acids.

Another aspect of the invention is method of preparing a chlorogenic acid-supplemented food or beverage product. The method includes adding a comminuted par-baked coffee bean composition described above to a food or beverage to form a chlorogenic acid-supplemented food or beverage product. The supplemented food or beverage product contains from about 0.1 g to about 10 g of the comminuted par-baked coffee bean composition per serving size of the food or beverage product.

Definitions

An "edible composition" or "food or beverage composition" as used herein can contain an edible solid, semi-solid, semi-liquid or liquid composition, and can include an aqueous emulsion or suspensions. Such composition can optionally be in the form of a nutritional or dietary supplement.

The term "green coffee beans" as used herein refers to harvested coffee beans that have not been roasted, baked, or otherwise heat treated. The color of "green coffee beans" can be green or another color, such as tan.

The term "par-baked" describes the heating and "partial baking" of green coffee beans under conditions that achieve reduction but not elimination of moisture, mild flavor development, elimination of the initial green color of the beans if any, but very little darkening of the beans beyond a yellowish, mustard, or tan color. Typically the green coffee beans are heated in air (or other gaseous environment that may be substituted for heated ambient air) at temperatures that are lower than traditional roasting temperatures, which generally exceed 400° F. In the range below roasting temperatures, higher temperature may be compensated by a shorter baking time so that the beans are not over-baked. For successful par-baking, a combination of temperature and baking time is used to achieve the desired extent of moisture reduction, weight density reduction, color and flavor development and desired alteration of other physical, chemical and organoleptic properties, but without significantly diminishing the original level of chlorogenic acid antioxidant present in the green coffee beans. Specific examples of par-baking as used in the invention are provided throughout the present application.

The term "disinfect" or "disinfection" as relates to green coffee bean refers to the elimination of a major proportion (e.g., 99% or more) of microbial contaminants present in or on par-baked green coffee prior to packaging the coffee either as whole beans or as milled beans. In the present invention this is achieved by heating the beans to a temperature and for a time interval sufficient to kill most or all of the bacterial and/or fungal species present on the green coffee beans. There is an extensive literature that has been published on dry heat sterilization. In a publication entitled "Sterilization by dry heat" by E. M. Darmady et al. (J. Clin. Path. (1961), 14, 38-44) it is stated that in 474 tests using *Clostridium tetani*, selected because it is the most resistant of all microbial pathogens to dry heat, full sterility was achieved at 170° C. (338° F.) within 5 minutes and at 160° C. (320° F.) within 12 minutes. Accordingly, for the purposes of disinfecting coffee beans with dry heat for providing a packaged dry coffee bean product that is safe for food use, it is expected that exposure of coffee beans to a temperature of 320° F. for approximately 5-10 minutes is more than adequate. Exposure of coffee beans to a temperature as low as 220° F. for longer times (e.g., 2 hours) as described herein is also considered adequate for achieving disinfection.

The term "weight density" as used herein refers to the weight per unit volume of a material. The weight density of coffee beans can be measured, for example, by dividing the volume (e.g., in cubic centimeters) of water displaced by a quantity of coffee beans into the weight (e.g., in grams) of the quantity of coffee beans. Measurements of weight density reported herein are measured at ambient temperature (i.e., about 20° C.).

The term "Agtron infrared reflectance value" (or "Agtron value" or "Agtron number") refers to a number on a scale of 0.0 to 100 that provides an indication based upon the amount of near infrared light (between the wavelengths of 800 nm and 890 nm) that is reflected (as opposed to absorbed) from whole or milled coffee beans, prior to or following a par-baking or roasting treatment. The Agtron value is a measure of the degree to which coffee beans have been roasted. The presently described par-baked coffee beans typically exhibit Agtron values greater than 95 and may have values of 99 or greater.

The term "free moisture content" or "residual free moisture content" as used herein refers to the water content in whole or milled coffee beans that is released during 3 hours incubation in heated air, e.g., in a warming oven at a temperature of 105° C. "Moisture loss" in whole coffee beans was determined by gravimetric measurement, i.e., weighing beans before and after par-baking the green coffee beans.

The term "desiccant" refers to an agent that adsorbs water vapor from whole or milled coffee beans by being placed in proximity, e.g., in the same vessel, but not actually mixed with the coffee. Desiccants include but are not limited to silica gels and calcium chloride.

The terms "stabilizer" and "preservative" are defined by Vella et al., in U.S. Published Pat. Appl. No. 2011/0305792A1, which is incorporated herein by reference.

The term "milling" or "comminution" describes the process of grinding coffee beans of any variety and at any stage of processing regardless of whether the beans are green, par-baked or at any stage of roasting. Milling can be carried out using a grinding process, a cutting process, or another process. Milling can be accomplished in a one-step process or a multi-step process (i.e., an "iterative process" for reducing particle size in successive steps) in which the whole beans are comminuted into fragments or small particles.

The term "chlorogenic acid" or "CGA" includes (1S,3R,4R,5R)-3-{[(2Z)-3-(3,4-dihydroxyphenyl)prop-2-enoyl]oxy}-1,4,5-trihydroxycyclohexanecarboxylic acid (also known as 3-caffeoylquinic acid, CAS Registry Number 327-97-9, an ester of caffeic acid with quinic acid)) as well as a variety of isomers and structurally related molecules that are present in coffee beans, and also includes bioactive variants of CGA that may arise during the heating of coffee beans, such as during the par-baking process described herein. As many as nine or more different molecular isomers of CGA have been reported (Moon et al., J. Agric. Food Chem. 2009, 57, 5365-5369). The amounts of CGA present in the coffee bean-derived compositions described herein can be determined, for example, by aqueous extraction of the compositions and comparison to a standard solution prepared from one of the CGA isomers (3-O-Caffeoylquinic acid or "3-CQA" available from Cayman Chemical Company, Ann Arbor, Mich.).

The terms "nutritional supplement" and "dietary supplement" are used interchangeably herein and refer to edible nutrients added to a diet, typically on a regular or periodic basis, and intended to supplement one or more nutrients that may otherwise not be consumed in sufficient quantity. These nutrients may include vitamins, minerals, fiber, fatty acids, amino acids and antioxidants among other substances.

DETAILED DESCRIPTION OF THE INVENTION

The present invention relates to a method of modifying green coffee beans by partial baking (par-baking) in such a way that when comminuted into fine particles, the coffee bean material is much more suitable for addition to foods, beverages, and nutritional supplements. The comminuted par-baked coffee bean material is produced from the entire green coffee bean by par-baking, i.e., heating in air for a limited time interval (e.g., 7-25 minutes) and at a temperature of less than 380° F., and preferably between approximately 280° F. and 360° F. More preferably, the par-baking temperature is between about 300° F. and 360° F. The temperature range for par-baking is considerably lower than temperatures used for roasting coffee (generally between 420° F. and 525° F.). The lightest of all traditionally roasted coffee beans is known as "cinnamon roast," produced by a roasting process in which the internal temperature of the coffee bean reaches 385° F. but not 400° F., causing the coffee beans to become cinnamon brown. In the present invention, the par-baking process involves heating or baking of green coffee beans in air at temperatures that are diminished to a level below those used to produce cinnamon roast coffee beans. Accordingly, the green coffee beans are par-baked at a lower temperature than that used to obtain a cinnamon roast, between 300° F. and 350° F., and for a period of time such that the beans themselves remain well below 385° F., and preferably below 380° F. or even below 375° F. or 370° F. in certain embodiments.

In order to produce the par-baked coffee beans of the present invention, green coffee beans are par-baked for approximately 5-25 minutes (preferably 8-15 minutes) at a temperature of approximately 320° F.±40° F. (about 160° C.±22° C.). Normal heated air can be used to create the heating and drying environment during par-baking. By contrast, hot water and/or steam treatment of coffee beans (see, e.g., Leloup et al., U.S. Published Pat. Appl. No. 2012/0025168A1 and Milo et al., U.S. Pat. No. 8,455,019) are preferably avoided in the present invention for treating green coffee beans because such treatments are inconsistent with one of the objectives of the presently described par-baking process, which is to substantially reduce the natural moisture level found in green coffee.

Green coffee beans, with their initial moisture level of approximately 12% by weight and significant mechanical elasticity, are very challenging to mill or otherwise to grind into small particles. For example, Vella et al., in Published U.S. Pat. Appl. No. 2011/0305792A1 describe a process of grinding/sizing of green coffee particles in which frictional heat generated during grinding is very damaging to phytonutrients. Consequently, Vella et al. control this frictional heating by iterative grinding steps until particles are 20 mesh (0.84 mm) or smaller. While 0.8 mm particles may be useful for producing compressed tablets or capsules, the preferred particle size for the present invention is 3-fold to 8-fold smaller in diameter (approximately 27- to 500-fold smaller in mass). These sizes translate to diameters of approximately 0.3 mm (300 microns or 50 mesh), 0.25 mm (60 mesh) 0.2 mm (70 mesh), 0.15 mm (100 mesh) or even 0.1 mm (100 microns or 140 mesh) or smaller, in which the material is to be added to a food or a beverage as described in the present invention. By contrast, the 20 mesh particles of Vella et al. have an extremely gritty mouth feel that limits their utility when added to foods and beverages. With the present invention, par-baking reduces bean moisture level from initial values of 11%-12% in green coffee beans to approximately 4%-5% by weight and significantly alters the bean structure as the beans increase in volume and decrease in density, rendering the beans easier to mill, with much lower frictional heating. This allows milling of par-baked whole coffee beans into the very small particles described above (e.g., 60, 70, 100 and 140 mesh particles) in a single milling step.

The conditions described herein for par-baking green coffee beans, i.e., heating at a temperature of approximately 300-360° F. (maximum range of 280-380° F.) for approximately 8-15 minutes (maximum range of 6-20 minutes) are approximately 100° F. cooler than the temperatures generally used during traditional coffee roasting, and are less oxidizing. For example, traditional coffee is produced using roasting temperatures of 420-525° F. or higher and roasting times ranging from 5 to 20 minutes. Such roasting causes substantial darkening or even blackening of the coffee bean while the bean is undergoing extensive chemical changes, e.g., general oxidation, formation of Maillard reaction products, and also pyrolysis. Moreover, during roasting, there is a substantial and undesirable decrease in the CGA antioxidant content of the coffee bean as oxidation occurs. Coffee beans that undergo traditional roasting, including both light and dark roasted beans, also experience a physical event known as "first crack" when the beans reach a temperature of approximately 400° F. During normal roasting, the beans are heated and pressurized with internal moisture and steam, and expand in volume. Expansion during roasting and release of moisture further embrittles the bean and facilitates subsequent milling of the bean in typical coffee grinders. Notwithstanding "first crack" as a landmark during coffee roasting, this landmark is avoided for par-baking coffee beans according to the present invention.

As green coffee beans are par-baked and subsequently milled to a suitable particle size, the coffee bean becomes a palatable prepared food ingredient. Par-baked and subsequently milled coffee beans differ from either milled raw green coffee beans, steamed or cooked green coffee beans, or traditionally roasted coffee beans. More specifically, the appearance, milling characteristics, flavor, aroma, moisture content, microbial content, weight density, and/or chlorogenic acid (CGA) content distinguish the par-baked beans from green and/or traditionally roasted coffee beans.

Selection of Coffee Bean Species

Two principal commercial species of coffee bean (genus *Coffea*) currently grown and sold throughout the world are known as *arabica* and *canephora* (or more commonly *robusta*). During their growth, two coffee beans are contained within the fruit known as a coffee cherry. While the *robusta* bean is currently less costly and is considered somewhat less desirable than the *arabica* bean for preparing premium coffee beverages, it generally contains a somewhat higher level of CGA antioxidants. Therefore, for the purposes herein, the *robusta* bean is useful and in some instances may be preferable to the *arabica* bean. Commercially harvested and dried green coffee beans typically containing approximately residual moisture at 10-14% by weight, or more typically 11-12% by weight, were used in preparing the par-baked and milled coffee beans described herein. This moisture level may vary depending upon the drying method, storage environment and shipping conditions used.

Par-Baking of Coffee Beans

While it is recognized that the traditionally roasted and milled coffee beans have an agreeable aroma and flavor when brewed, the roasted bean particles suffer from an excessively strong flavor when added to foods, and the dark color of ground coffee alters the appearance of coffee-supplemented foods and beverages. Moreover, roasting consistently reduces the level of beneficial CGA. Therefore, the par-baking conditions of the present invention are selected to avoid strong flavor and color development as well as to preserve the CGA content of green coffee beans. In addition, the par-baking conditions are selected to promote easier grinding or milling compared to green coffee beans, so as to yield a fine particulate product that can be added to foods and beverages, or even consumed directly, without a gritty mouthfeel.

To accomplish par-baking, whole green coffee beans are heated and baked in substantially dry air at a temperature ranging between approximately 300 and 360° F., e.g., 320-340° F., for approximately 7-20 minutes, e.g., 12 minutes). The beans are heated to an effective temperature that is above the boiling point of water, and for effective time interval. Effective temperatures and time intervals are, for example, 320° F. for 12 minutes, or more broadly for example, 220° F., 240° F., 260° F., 280° F., 300° F., 320° F., 340° F., or 360° F., but less than 380° F., for between 6 and 20 minutes. Alternatively, the bean is heated in air at a considerably lower temperature for a longer time interval (e.g., 7-25 minutes) and at a temperature of between approximately 280° F. and 360° F. (in any event less than 380° F.). More typically, the par-baking temperature is between 300° F. and 360° F. Temperature ranges that can be used during par-baking include from about 220° F. to about 250° F., from about 250 to about 280, from about 250° F. to about 360° F., from about 300° F. to about 350° F., from about 280° F. to about 310° F., from about 310° F. to about 340° F., and from about 320° F. to about 360° F. The beans may be exposed to a temperature as high as 375° F. for a short period of time. Typical par-baking time intervals may vary but typically range between 6 and 20 minutes or between 10 and 15 minutes for the higher temperature ranges (e.g., 320° F. and 360° F.), or may be extended to as long as 30 minutes, 1 hour and/or 2 hours for the lower temperatures, e.g. between 220° F. and 250° F., to achieve desired amounts of change in physical, chemical and organoleptic properties of the coffee beans. The extent of par-baking may be monitored by any of a number of criteria, including bean color, odor, bean moisture content, bean weight density, and near infrared light reflectance of the beans or comminuted beans. Alternatively, the par-baking process can be carried out strictly according to pre-selected temperature and time criteria.

While not wishing to be limited by any particular mechanism, an effective par-baking temperature is in excess of the boiling point of water to cause moisture that is trapped within the coffee bean to become steam and cause expansion and structural weakening of the bean, resulting in swelling and reduction of weight density. The use of a par-baking temperature above the normal boiling point of water (100° C. or 212° F.), such as 220° F. and preferably higher, accomplishes several objectives, including microbial killing and disinfection of the beans, and volatilization of at least some unpleasant volatile organic compounds including volatile organic acids and aldehydes.

Par-baking can be carried out, for example, in a horizontally oriented, rotating drum oven or in a forced hot air oven (fluidized bed oven) in which heat is provided by combustion of natural gas or liquefied petroleum gas, by electric heating elements, or even by wood burning. Following par-baking, the baked beans can be removed from the oven onto a support surface where ambient or cooled air optionally can be propelled through the bed of beans by a fan. Alternatively, the beans can also be slowly stirred or tumbled, or simply allowed to cool while standing in ambient air without mixing.

The present par-baking process is distinguished from roasting, on the one hand, and from cooking or steaming, on the other heated hand. The temperature used during par-baking is approximately 100° F. or more cooler than the temperatures used during traditional coffee roasting, and is less oxidizing. Furthermore, while roasting removes most of the residual free moisture from the green beans, par-baking is used to remove only a portion (e.g., 50%-75%) of the residual free moisture from the beans, leaving a level of moisture equal to approximately 2.0%-5.5% of the weight of the par-baked beans. Maintaining this level of residual moisture in the bean has been found to be important for obtaining beans that, when subsequently milled, provide coffee bean particles that are hydrophilic and can be freely dispersed in water, aqueous foods and beverages. By contrast, traditionally roasted coffee beans yield milled particles that are more hydrophobic and tend to float on water at ambient temperature rather than dispersing. While cooking or steaming of green coffee beans, on the other hand, has been reported to preserve CGA levels in the beans, maintaining a level of moisture of greater than 6% by weight in the beans does not produce the desirable flavor changes associated with par-baking, nor does cooking or steaming promote the embrittlement of the coffee bean that results from par-baking. The embrittlement enables easy and convenient milling of the bean into fine particles or powders following par-baking.

Differences Between Par-Baked Coffee Beans and Green Coffee Beans

In contrast to green coffee beans, the presently described par-baked coffee beans have the following distinguishing characteristics:

(a) Following par-baking, coffee beans become sufficiently fragile to be conventionally milled. During par-baking, the green beans lose much of their elasticity and toughness that make them difficult to mill. (b) Par-baked coffee beans retain at least 90% by weight of the original CGA content of the green coffee beans from which they are obtained.

(c) Par-baked coffee beans retain approximately 2.0%-5.5% by weight moisture (losing approximately half or more of their typical initial 11-12% by weight moisture). This retained moisture is believed to be helpful in limiting undesirable oxidative browning, Maillard reaction products, and/or any significant oxidative loss of CGA antioxidant. The residual moisture appears to contribute to par-baked coffee bean particles remaining hydrophilic.

(d) Par-baked coffee beans are substantially free of viable microbial contaminants (e.g., bacterial and mold resulting from agricultural production) without any secondary treatment (e.g., chemical disinfection or irradiation).

(e) Par-baked coffee beans acquire a mild, agreeable, and pleasantly nutty flavor and aroma, which renders them useful as a food additive.

(f) Comminuted par-baked coffee beans are easily flavor-modified with sugar, high intensity sweeteners, flavor extracts and any of a variety of other agents that alter flavor and/or aroma.

(g) Par-baked coffee beans and milled particles derived from them have lost their green pigmentation and are yellowish to tan (mustard in color). The light tan color allows the combining of particles of par-baked coffee with light colored foods, bakery products, and beverages for example, without significant discoloration.

Loss of Volatile Organic Compounds During Par-Baking of Green Coffee Beans

Volatile compounds in green coffee beans include short chain fatty acids, aldehydes, and nitrogen-containing aromatic molecules, such as derivatives of pyrazines (green herbaceous, or earthy odor). A number of these volatile compounds are responsible for the unpleasant odor and taste of green coffee beans especially when they are milled. Short chain fatty acids include acetic, propionic, butanoic, pentanoic, and hexanoic through decanoic acids. Unpleasant aroma derivatives of such fatty acids include 3-methyl valeric acid, acetaldehyde, and other aldehydes including propanal and butanal. When green coffee beans are roasted, some of these compounds are oxidized and many are volatilized. The par-baking conditions described herein have been found to volatilize many of the unpleasant aroma and flavor compounds present in green coffee beans, thereby improving the organoleptic properties of the comminuted par-baked coffee bean product compared to green coffee beans, but without the formation of strong flavorants or the loss of CGA observed in roasted coffee.

Differentiation of Par-Baked Coffee Beans from Roasted Beans by Infrared Reflectance According to the present invention, the par-baking process is terminated and the coffee beans removed from the heating vessel when their measured near infrared light reflectance value for light between wavelengths of 800 nm and 890 nm (i.e., Agtron value—see below) is still very high (i.e., greater than 95 and preferably between 96 and 100 on the 0.0 to 100 Agtron scale, as measured for milled beans having a particle size of 100-200 microns. In contrast, the Agtron value for cinnamon roast coffee beans is lower (i.e., 95 or less, and typically between 80 and 95).

The infrared light reflectance of the beans can be monitored using an Agtron reflecting infrared spectrophotometer as a measure of the extent of par-baking, similar to its use to measure the extent of higher temperature roasting. This measurement is more useful than monitoring the color or darkness of coffee beans. The so-called "Agtron number" or "Agtron value" is used to define the degree of roasting of coffee beans (Agtron, Inc. Reno, Nev.; see also agtron.net/pdf/om/E20CP-OM.pdf. These infrared reflectance spectrophotometer devices measure the amount of near-infrared light energy emitted between the wavelengths of 800 nm and 890 nm and reflected from a sample of milled beans. Infrared reflectance correlates with development of organic flavor compounds to provide better control and consistency in baking or roasting as it relates to flavor development. Agtron numbers are based on a scale from 0 to 100, where 0 represents no reflectance (complete infrared absorption) and 100 represents unroasted milled coffee beans. Coffee beans are typically roasted to Agtron values of 25 to 75, with most in the 55-75 range. The associated style of roasted coffee with accompanying Agtron values, and approximate colors with appearance of the bean's surface are as follows: for Cinnamon roasts, 70-90, light brown, dry surface; Medium American roasts, 50-70, medium brown, dry surface; French roasts, 40-50, medium to dark brown, small oil patches; French espresso roasts, 35-40 dark brown, shiny oily surface. The Agtron number measured for par-baked coffee beans that have been milled or ground into typical 100-200 μm diameter particles can be in the range from about 96 to about 99.9, and preferably is in the range from about 99 to about 99.9.

Differentiation of Par-Baked Coffee Beans from Green and Roasted Coffee Beans by Density Another physical property used to characterize the par-baked coffee beans of the invention, is the coffee bean weight density. The weight densities of several varietal green coffee beans, as well as their weight densities after par-baking were determined using two different conditions of temperature and time. The weight densities for the same beans were also determined after extended drying performed according to the method of Vella et al. (Published U.S. Pat. Appl. No. 2011/0305792A1) Weight densities of a number of traditionally roasted commercial coffee bean products were also measured. Moisture loss during par-baking and also with extended drying of whole beans was also measured, as well as the "residual free moisture" remaining in the coffee beans (see "$H_2O$ Residual" in Table 1). These quantities were determined by accurately weighing approximately 20 g of green coffee beans, and then weighing the beans after par-baking and finally again after extended drying (3 hours incubation of the beans in an oven equilibrated at 105° C.). The measured weight loss (multiplied by 100) divided by the previous weight of the beans provided the percentage moisture shown in Table 1.

Weight densities of coffee beans were determined according to the following protocol. An accurately measured weight of whole coffee beans (approximately 10.0 g measured to the nearest milligram) was placed in a 50.00 ml volumetric flask. The precise weight of water (at ambient temperature) required to fill all of the space around the coffee beans and bring the meniscus level of water plus coffee beans up to the 50.00 ml graduation marking was accurately measured. Any trapped air bubbles in the water volume around coffee beans in the volumetric flask were quickly removed using a stir wire, and weights were measured within one minute to minimize any error due to absorption of water by the beans. The measured weight of water corresponded to 50.00 g (=50 ml) volume of water minus the volume occupied by the coffee beans (1.00 g water=1.00 ml water). Taking that calculated coffee bean volume as the denominator and the weight of the coffee beans as the numerator yielded the density of the coffee beans.

As shown in Table 1, the measured weight densities for green coffee beans range between 1.17 and 1.27 $g/cm^3$ while the densities for traditionally roasted beans are essentially half as large, ranging between approximately 0.56 and 0.63 $g/cm^3$. Interestingly, with the four varietal coffee beans (two *arabicas* and two *robustas*) that were par-baked for either 12 minutes at 320° F. or for 2 hours at 220° F. the PB weight densities ranged between 0.98 and 1.09 $g/cm^3$.

During the course of these measurements it was noticed that, with each of the four varietals, some of the par-baked beans slowly floated upward in water while some slowly sank, consistent with their measured weight densities of very nearly 1.00 $g/cm^3$. By contrast, all green coffee beans immediately sank while all traditionally roasted beans floated, consistent with their weight densities significantly greater than, and less than water, respectively. It is also evident that in these tests the average weight density of par-baked beans (≈1.03 $g/cm^3$) was closer to that of green beans (averaging 1.22 $g/cm^3$) than to traditionally roasted beans (averaging 0.60 $g/cm^3$). This is consistent with the fact that heating of par-baked beans is completed before the green coffee beans undergo "first crack" (the popping and large increase in bean size, a transition that is always crossed for traditionally roasted beans) resulting in a 50% decrease in density (which changes from about 1.22 $g/cm^3$ for green beans to about 0.60 $g/cm^3$ for roasted beans).

Decaffeinated green coffee beans were found to possess about the same density as regular caffeinated green coffee beans. The densities of two batches of decaffeinated green coffee beans obtained from the New England Coffee Company (Malden, Mass.) were determined. These included (i) a methylene chloride-decaffeinated *robusta* green bean that was shown to have a density of 1.21 $g/cm^3$ and (ii) a methylene chloride-decaffeinated blend of *arabica* beans that was shown to have a density of 1.20 $g/cm^3$. Thus, the typical decaffeination process does not impact the density of the starting material for the present par-baking process.

In comparing the weight densities of par-baked beans with the corresponding green beans from which they were derived, it is interesting to note that some of the decrease in density occurring during par-baking (an average decrease of≈16%) can be attributed to loss of moisture (an approximate 7-8% moisture weight loss during par-baking, with approximately 3% residual free moisture remaining after par-baking as determined by further weight loss after 3 hour additional drying/incubation at 105° C.). The rest of the density decrease as green beans become par-baked beans is attributable to physical expansion of the beans. While not intending to limit the invention to any particular mechanism, it is believed that the physical expansion of the beans during par-baking is the result of relatively rapid conversion of water within the beans to steam. The expansion is important because it at least partially disrupts the original structure of the green coffee bean and thereby helps embrittle the bean to facilitate subsequent milling of the par-baked beans into very small particles. The size of the particles enables the milled par-baked beans to be added to foods and beverages without producing a gritty mouth feel upon eating.

The same four varieties of green coffee beans used in the experiments shown in Table 1 Sections A and B were subjected to the drying conditions of Vella et al. (24 hours at 130°F) and the densities determined. Results are provided in Table 1C. While a minor decrease in average bean density was observed (1.22 decreasing to 1.18 g/cm²=3%), this decrease is more than accounted for by an average 5.9% by weight loss of moisture during drying. Therefore, no measurable expansion in the volume of the beans occurs during drying at 130° F.

TABLE 1

A. Coffee Bean Weight Density & Moisture After Par-Baking 12 min at 320° F.

| Bean Varietal | Density (g/cm$^3$) | | Moisture (% by weight) | |
|---|---|---|---|---|
| | Green | Par-Baked | $H_2O$ Loss | $H_2O$ Residual |
| Robusta NECC Cherry AB | 1.17 | 0.98 | 6.9% | 2.6% |
| Robusta Gillies Vietnam | 1.19 | 1.01 | 7.0% | 2.9% |
| Arabica Howell El Vergel | 1.27 | 1.03 | 7.9% | 3.5% |
| Arabica NECC Better Arabica | 1.24 | 1.01 | 7.0% | 3.4% |
| Average value: | 1.22 | 1.01 | 7.2% | 3.1% |

B. Coffee Bean Weight Density & Moisture After Par-Baking 2 hr at 220° F.

| Bean Varietal | Density (g/cm$^3$) | | Moisture (% by weight) | |
|---|---|---|---|---|
| | Green | Par-Baked | $H_2O$ Loss | $H_2O$ Residual |
| Robusta NECC Cherry AB | 1.17 | 0.98 | 7.4% | 3.1% |
| Robusta Gillies Vietnam | 1.19 | 1.07 | 7.5% | 2.9% |
| Arabica Howell El Vergel | 1.27 | 1.09 | 9.1% | 3.0% |
| Arabica NECC Better Arabica | 1.24 | 1.09 | 8.6% | 2.6% |
| Average value: | 1.22 | 1.06 | 8.2% | 2.9% |

TABLE 1-continued

C. Coffee Bean Weight Density & Moisture After Drying 24 hr at 130° F. (Vella et al.)

| Bean Varietal | Density (g/cm$^3$) | | Moisture (% by weight) | |
|---|---|---|---|---|
| | Green | Dried | $H_2O$ Loss | $H_2O$ Residual |
| Robusta NECC Cherry AB | 1.17 | 1.11 | 5.1% | 2.1% |
| Robusta Gillies Vietnam | 1.19 | 1.15 | 5.3% | 1.9% |
| Arabica Howell El Vergel | 1.27 | 1.19 | 7.0% | 2.3% |
| Arabica NECC Better Arabica | 1.24 | 1.27 | 6.25% | 2.0% |
| Average value: | 1.22 | 1.18 | 5.9% | 2.1% |

D. Coffee Bean Weight Density (g/cm$^3$) of Commercially Roasted Arabica Coffees

| Commercial Source | Density (g/cm$^3$) |
|---|---|
| Starbucks Blonde Willow Blend | 0.63 |
| Trader Joe's French Roast | 0.56 |
| Trader Joe's Smooth and Mellow | 0.62 |
| Trader Joe's Ethopian Peaberry | 0.58 |
| Average value: | 0.60 |

Differentiation of Par-Baked Coffee Beans from Green and Roasted Beans Based on Expansion without Achieving "First Crack"

Based upon the numerical data in Table 1, together with the observation that the beans do not "pop" (much like popcorn) during the par-baking procedure described here, the par-baked beans can be further characterized as a product of heating green coffee beans without inducing "first crack." During the par-baking process, the beans expand in volume and correspondingly decrease in their weight density by approximately 15% to 25%. According to the data in Table 1, weight densities were observed to diminish from approximately 1.22 g/cm$^3$ for green beans to approximately 1.0-1.1 g/cm$^3$ for par-baked beans. In subsequent experiments (see Example 10 below), the density of green coffee beans was shown to decrease as much as 25% during par-baking. Similar results have been obtained for the par-baking of decaffeinated green coffee beans.

Differentiation of Par-Baked Coffee Beans from Green and Roasted Coffee Beans by Acidity Acidity levels present in all of the varieties of coffee beans described in Table 1 were determined by pH measurement of incubated extracts prepared from the milled beans. Aqueous extract samples were incubated first at 37° C. and subsequently at 95° C. to differentiate between more soluble acidic species (soluble and extractable at lower temperature) and less soluble acidic species (extractable only at higher temperature). Beans included four different varieties of regular commercially roasted coffee beans, and, in addition, the four varieties of coffee beans described hereinabove (analyzed for weight density, see Table 1). Green coffee beans of the latter four varieties were measured for their acidity. These same beans were then also par-baked either for 12 min at 320° F. (160° C.) or for 2 hr at 220° F. (105° C.). Beans were milled in a Breville coffee grinder (model BCG800XL) adjusted to a fine drip grind setting. The size of milled particles determined by light microscopy ranged between approximately 100 and 250 microns in diameter. Acidity was measured at 20° C. using a calibrated pH meter (standardized at pH 7.00 and accurate to 0.01 pH unit). Soluble material was extracted from 1.00 g samples of the milled beans incubated in 12.00 ml of distilled water (pH 7)

contained in individually sealed 15 ml propylene clinical centrifuge tubes. These amounts of milled beans and water correspond to a typical brewed coffee in which 12 g of coffee grounds may be used to brew 5-6 oz of coffee. Each pH measurement was recorded following sample incubation initially at 37° C. for 1 hr, and subsequently after incubating the same sample at 95° C. for an additional 10 minutes. Low speed centrifugation was used to pellet solids in all centrifuge tubes prior to pH measurement. It is generally appreciated that moderate degrees of roasting tend to develop a desirable level of acidity in coffee beans.

Table 2 provides pH measurements for the aqueous extracts described above. Considered in their entirety, these results provide information on coffee acidity and how par-baked coffee beans can be differentiated from both traditional roasted coffee beans and from green coffee beans based upon their acidity.

More specifically, commercially roasted coffee beans (Table 2A) contained substantial acidity (see Table 2A). On the basis of pH, a greater amount of acidity was released from roasted beans than from either green beans (Table 2B) or par-baked beans (Table 2C and D). The term "greater acidity" is herein defined by a lower pH measured following aqueous extraction. Greater release of acidity from roasted beans was evident at both 37° C. (average pH=5.29) and 95° C. (average pH=5.12) with the higher extraction temperature promoting an additional release of acidity (averaging a further 0.18 pH unit decrease).

Green coffee bean extracts, by comparison (Table 2B), were considerably less acidic than roasted bean extracts following both 37° C. and 95° C. incubation, averaging 0.6 pH unit higher (pH=5.75 and 5.73 respectively). There was only a trace of additional acidity released (pH decrease of 0.02 unit) after the green coffee beans were incubated at the higher temperature following the lower temperature incubation.

With regard to par-baked coffee beans, the pH values measured in extracts of beans that were par-baked for 12 min at 160° C. (320° F.) and then milled and extracted at 37° C. (see Table 2C), the average extract pH was 5.71. This value is slightly lower than the pH 5.75 value measured for milled green coffee extracted at 37° C. When subsequently incubated and extracted for 10 minutes at 95° C., the average extract pH decreased further to pH 5.55. This pH decrease is important because it is significantly lower than the pH 5.73 value measured for green coffee beans similarly extracted at 95° C. and thereby allows par-baked coffee beans to be clearly differentiated from green coffee beans. This pH decrease also suggests that the par-baking process at 160° C. (320° F.) produces acidic molecular species not present in green coffee beans. These additional acidic species are detectable by extracting the milled par-baked beans in water at 95° C. With regard to differentiating par-baked coffee beans from traditionally roasted beans, the average extract pH for the four varieties of par-baked beans are 5.71 and 5.55 measured, respectively, following 37° C. and 95° C. incubation. These pH values are considerably higher (less acidic) than the pH values measured for roasted coffee beans (pH 5.29 and 5.12, respectively, for 37° C. and 95° C. incubations of milled roasted beans). These higher pH values (in addition to obvious color and flavor differences) allow par-baked coffee beans to be differentiated from roasted beans.

With coffee beans that were par-baked at a substantially reduced temperature, i.e., 105° C. (220° F.) and for an extended time period (2 hrs), different results were obtained (see Table 2D). There was no statistically significant difference between the pH values in Table 2D and the values obtained with green coffee bean extracts shown in Table 2B. There was also little additional acidity released after 95° C. incubation that wasn't already released after 37° C. These results suggest there is negligible development of acidity in coffee beans incubated at 105° C. even when incubation is continued for a lengthy period of time, i.e., 2 hrs. By contrast, par-baking green coffee beans at 160° C. for as little as 12 minutes surprisingly produces measurable acidity releasable at 95° C. (see Table 2C). Thus, while acidity measurement is useful for differentiating higher temperature (e.g., 160° C.) par-baked coffee beans from green coffee beans, acidity may not be useful for differentiating low temperature (e.g., 105° C.) par-baked beans from green coffee beans.

TABLE 2

A. Acidity in Aqueous Extracts of Milled Commercially Roasted Coffee Beans

| | pH After Incubation | | |
|---|---|---|---|
| Commercial Source | at 37° C. | at 95° C. | pH change |
| Starbucks Blonde Willow Blend | 5.18 | 5.03 | −0.15 |
| Trader Joe's French Roast | 5.52 | 5.26 | −0.26 |
| Trader Joe's Smooth and Mellow | 5.19 | 5.05 | −0.14 |
| Trader Joe's Ethiopian Peaberry | 5.28 | 5.12 | −0.16 |
| Average values: | 5.29 | 5.12 | −0.18 |

B. Acidity in Aqueous Extracts of Milled Green Coffee Beans

| | pH After Incubation | | |
|---|---|---|---|
| Bean Varietal | at 37° C. | at 95° C. | pH change |
| Robusta NECC Cherry AB | 5.73 | 5.70 | −0.03 |
| Robusta Gillies Vietnam | 5.78 | 5.79 | +0.01 |
| Arabica Howell El Vergel | 5.70 | 5.65 | −0.05 |
| Arabica NECC Better Arabica | 5.79 | 5.78 | −0.01 |
| Average values: | 5.75 | 5.73 | −0.02 |

C. Acidity in Aqueous Extracts of Milled Par-Baked Coffee Beans (12 min at 320° F.)

| | pH After Incubation | | |
|---|---|---|---|
| Bean Varietal | at 37° C. | at 95° C. | pH change |
| Robusta NECC Cherry AB | 5.87 | 5.71 | −0.16 |
| Robusta Gillies Vietnam | 5.75 | 5.57 | −0.18 |
| Arabica Howell El Vergel | 5.57 | 5.42 | −0.15 |
| Arabica NECC Better Arabica | 5.64 | 5.50 | −0.14 |
| Average values: | 5.71 | 5.55 | −0.16 |

D. Acidity in Aqueous Extracts of Milled Par-Baked Coffee Beans (2 hr at 220° F.)

| | pH After Incubation | | |
|---|---|---|---|
| Bean Varietal | at 37° C. | at 95° C. | pH change |
| Robusta NECC Cherry AB | 5.75 | 5.72 | −0.03 |
| Robusta Gillies Vietnam | 5.76 | 5.73 | −0.03 |
| Arabica Howell El Vergel | 5.76 | 5.73 | −0.03 |
| Arabica NECC Better Arabica | 5.82 | 5.78 | −0.04 |
| Average values: | 5.77 | 5.74 | −0.03 |

Characteristics of Par-Baked Coffee Beans and Milled Par-Baked Coffee Beans

Par-baked coffee beans produced according to the present invention were unexpectedly found to have substantially improved and desirable milling characteristics compared to green coffee beans and improved properties as a milled product compared to milled green or roasted coffee beans.

The par-baked beans, particularly when milled to a fine powder, have improved physical, chemical, microbiological and organoleptic properties when compared with raw green coffee beans. For example, the par-baked beans exhibit physical embrittlement that facilitates milling of beans with reduced frictional heating and consequently reduced oxidation of CGA, a class of useful antioxidants.

Surprisingly, the presently described par-baking process (e.g., 10 minutes at 320° F.) and subsequent milling of the par-baked beans did not significantly diminish the CGA level (e.g., the par-baked *robusta* coffee beans contained ≈10% CGA by weight and typically showed no detectable decrease in CGA level when compared to the corresponding green coffee beans. Quantitative extraction of CGA and UV spectral analysis were used in such comparisons. Total and relative CGA contents in various milled coffee bean samples were determined as follows: 25.0 mg of milled coffee beans were mixed and incubated with 75.0 g of preheated distilled water (95° C.) for 1 hr in a closed glass container placed in a warming oven set to 95° C. Each container was swirled every 15 minutes to assure complete extraction of CGA from the coffee bean particles. After the incubation, the samples were cooled to room temperature and 14 ml aliquots from each sample were centrifuged in polypropylene centrifuge tubes to sediment and eliminate any suspended coffee bean material. Each sample was then placed in a 1 cm path length quartz optical cuvette for UV spectrophotometry. A baseline scan for the cuvette containing distilled water was run just before placing the sample in the cuvette. Relative CGA levels in different samples were determined by comparing their UV absorbances (i.e., optical densities) at the absorption peak for CGA (325 nm). Absolute CGA levels in extracts of milled coffee bean samples (prepared as described above) were determined by comparing their UV absorbance at the 325 nm absorption peak, to a known standard solution of CGA. For example, a standard solution is prepared by dissolving 5.0 mg of CGA (3-O-caffeoylquinic acid, CAS 327-97-9 available from Cayman Chemical Co., Ann Arbor, Mich.) in 300 g of distilled water (60,000× dilution). By comparison, if all of the CGA present in 25 mg of a milled coffee bean sample is extracted into 75 g water (3,000× dilution of the bean sample), and if the beans contain 5% by weight CGA, the final dilution by weight of the bean's CGA will also be 60,000×. If so, the magnitude of the 325 nm UV peaks for the CGA standard solution and the bean sample should be equivalent.

Furthermore, the par-baked beans have a level of moisture that has been greatly reduced compared to green coffee beans. This moisture reduction provides better chemical stability and shelf life than green coffee, without the need to add a desiccant (see, e.g., Vella et al., Published U.S. Pat. Appl. No. 2011/0305792A1, teaching the addition of stabilizer dessicant agents to a green coffee bean product). Par-baking also provides killing of microbes (i.e., disinfection) and typically full sterilization of the beans without solvent treatment (see, e.g., Vella et al., teaching solvent treatment of green coffee beans for disinfection). Importantly, the par-baking process also substantially improves on the flavor of green coffee, developing a pleasant nutty flavor and aroma that differ markedly from traditional roasted coffee as well as from milled green coffee bean material (see Vella et al.). When comminuted, and especially when finely milled, the par-baked beans of the present invention are a surprisingly palatable, flavorful, and health-promoting food product or additive for foods, beverages, or nutritional supplements.

With regard to the use of par-baked and subsequently finely milled coffee beans as a food and beverage ingredient, these beans have desirably improved properties when compared to traditionally roasted and milled coffee beans. The latter have a characteristically dark color and strong flavor, as well as a significantly diminished CGA content and a more oily and hydrophobic nature. By contrast, par-baked and finely milled coffee beans have a much lighter color, milder flavor, higher CGA content, and a beneficially hydrophilic nature which provides improved dispersibility in water-based foods and beverages.

Par-baking is followed by comminuting the beans to form fine particles. The comminution can be performed by a variety of possible methods, such as crushing, cutting, grinding, or milling. Milling in a standard commercial coffee milling machine is preferred. The comminuted particles have a diameter of less than 0.5 mm (less than 500 microns), but in certain embodiments the particle size can be less than 2 mm, less than 1 mm, less than 0.4 mm, or in the range from about 0.4 mm to about 1 mm, or from about 0.4 mm to about 0.7 mm. The weight average particle diameter can be less than 400 microns, e.g., less than 300 microns, less than 200 microns, less than 150 microns, between 50 and 100 microns, between 50 and 150 microns, or between 50 and 200 microns.

The chemistry of traditional coffee roasting includes both a low temperature endothermic (i.e., heat absorbing) phase and a higher temperature exothermic (i.e., heat emitting) phase. The high temperature phase is accompanied by pyrolysis as sugars begin to caramelize, and carbon is produced as the beans reach a temperature in excess of approximately 380-390° F. (accelerating at 400° F. and above).

Unlike traditional roasting, the process of par-baking as used in the present invention includes only an endothermic process in which the green coffee beans are heated without any significant pyrolysis occurring. As evidenced by the surprising constancy in the overall CGA level before and after par-baking, little if any oxidation or other loss of CGA occurs during the par-baking of green coffee beans. The par-baked beans contain less than 6% moisture by weight of retained moisture, and in certain embodiments the par-baked beans contain approximately 2.0% to 5.5% moisture by weight, or approximately 3%-5% moisture by weight.

Traditional coffee roasting always is performed past the point of "first crack" at which the beans expand and emit a cracking sound; this occurs at around 401-405° F. Remarkably, the par-baked beans of the present invention are much more easily milled than green coffee beans even though the par-baked beans remain uncracked, i.e., they have not experienced "first crack" expansion). The par-baked coffee bean's flavor, aroma, moisture characteristics, microbial profile, shelf stability, and milling properties are superior to those of the green coffee bean, thereby enabling its widespread use in foods and beverages. Similarly, compared to traditionally roasted coffee, the par-baked coffee bean has a higher level of chlorogenic acid, milder flavor, and much lighter color, all of which are advantageous for general use in foods and beverages.

Serving Size or Dosage of Comminuted Par-Baked Coffee Beans

The milled par-baked coffee beans of the present invention are a superior nutritional source of CGA, because the coffee bean matrix material includes dietary fiber and other constituents that help protect, stabilize and control the release of CGA. A serving size for the purpose of addition to a food or beverage, or a dosage for the purpose of providing a dietary or nutritional supplement can be, for example, between 1 g and 10 g of milled par-baked coffee beans, and preferably is between 2.5 g and 5 g.

Green coffee bean extract has been commercially produced, packaged and sold for a number of years in a variety of forms and dosages in order to provide the health benefits attributable to the CGA antioxidants. Although initially prepared as an extract liquid, the extract is typically dried to a powder containing between 25% and 50% by weight of mixed CGA antioxidants that are packaged in a tablet or capsule. Capsules containing as much as 400-800 mg of the CGA extract (providing as much as approximately 200-400 mg CGA) are commonly available in nutrition centers and drug stores. The par-baked and milled *robusta* coffee bean powder as presently described (herein produced from a variety of *robusta* beans known as Cherry AB grown in India) has been shown to contain as much as 8%-10% by weight CGA. Thus, a serving size or dosage of the comminuted par-baked coffee bean composition can also be provided on a CGA basis, such as an amount of the composition that provides 200-400 mg CGA, or as much as 400-800 mg CGA.

CGA is very soluble in water. For example, experiments performed by the present inventor have shown that upon incubation in water warmed to 37° C., both coarsely and finely milled par-baked coffee beans release essentially all of their CGA content into that water within approximately 5 to 25 minutes. Therefore, based upon the 8% CGA content value for coffee beans, 2.5 g of the milled par-baked coffee beans will provide 200 mg of CGA, 5 g of the milled beans will provide 400 mg CGA, and 10 g of the milled beans will provide 800 mg CGA.

EXAMPLES

The following examples are illustrative of the present invention. All percentages are by weight unless otherwise stated.

Example 1. Milling Green *Arabica* Coffee Beans

Green coffee beans of one varietal of the coffee species *Coffea arabica* known as Tarazwere obtained from G. Howell Coffee Company (Acton, Mass.). When these beans (containing approximately 12% moisture) were placed in a conical burr-type coffee grinder (Breville model BCG800XL, Breville USA, Torrance, Calif.) and the motor activated, the beans jammed in the burrs. These same green beans were successfully milled using a more powerful particle mill at a commercial facility for the commercial milling of dry vegetable beans (Particle Control, Inc., Albertville, Minn.). The commercially milled sample of green coffee beans was fractionated into different particle size fractions by passing the particulate material through a series of sieves. Four particle size ranges were prepared, and each was evaluated for particle diameter by light microscopy using a reference grid with 50 µm spacing intervals. Four samples resulted: sample A=1000-1200 µm; sample B=400-600 µm; sample C=150-250 µm; and sample D=<150 µm. The relative amounts of CGA antioxidant in a constant amount by weight of each of these four samples were determined by extracting 50 mg of each sample in 100 ml distilled water incubated at 37° C. for 2 hrs. This extraction condition was intended to approximate the human digestive system.

Extracted samples were then centrifuged to obtain clear solutions for UV light spectrophotometry. The height and integrated area of the principal UV wavelength peak for CGA (325 nm) was measured and easily differentiated from the lower wavelength UV peak for caffeine at approximately 270 nm. Overlap from the caffeine peak was also minimal because the UV absorption peak for caffeine was typically 5-fold smaller than the CGA peak. From the integrated UV peak areas, the relative amounts of CGA in the above-described samples were as follows: A: 100 units, B: 95 units, C 80 units, D 74 units. It was noted that the UV spectral profiles and peak heights did not measurably change when the same coffee particle samples were subsequently boiled for 10 minutes. This indicates that essentially 100% of the CGA contained in the green coffee bean particles (including those up to at least 1.2 mm in diameter) are extractable into an aqueous environment within 2 hours of incubation at human digestive system temperature (37° C.). To explain the measured differences in CGA content among the different particle sizes, it is clear that milling of green coffee beans into the smaller particle sizes causes increasing amounts of degradation of CGA antioxidant, likely caused by heating and oxidation during milling of the beans in air. Smaller particles with greater ratios of surface to volume appear to suffer more oxidative degradation than larger particles.

Subsequently, a time course experiment was designed to measure just how rapidly CGA is released from relatively large green coffee bean particles (1.0-1.2 mm diameter). Under the same aqueous incubation conditions described above, 80-85% of the CGA was released within the first 20 minutes at 37° C., and within one hour 95% of the CGA was released. For the smaller sized particles, e.g., samples B, C and D incubated under identical conditions in water at 37° C., 95% CGA release occurred within 10 minutes. It is concluded that human ingestion of such milled material (particle sizes less than 1 mm) will achieve rapid and full release of CGA with its accompanying nutritional benefits.

Example 2. Par-Baking and Milling of *Robusta* Coffee Beans

Based on the results obtained in Example 1, it was considered desirable to reduce and minimize the amount of oxidative degradation of CGA in green coffee beans caused by milling. The hypothesis was tested that frictional heating during milling could be contributing to oxidative loss of CGA, and that if moisture were removed from the green coffee beans before milling, then the beans might be more easily milled to substantially smaller particle size and with less oxidative damage from frictional heating.

Adequate embrittlement for milling was not accomplished by merely drying green coffee beans at 130° F. for 24 hours, as taught by Vella et al. Attempts to grind four varieties of green beans (two varieties of *robusta* and two *arabica*) that had been dried for 24 hours at 130° F. resulted in jamming of the grinder (Breville model BCG800XL conical burr-type coffee grinder (Breville USA Inc., Torrance, Calif.)). Subsequently, the incubation temperature for the same beans was raised from 130° F. to 220° F. and incubation was continued for only 2 more hours. Surprisingly, the same beans then became millable and were ground to approximately a 70 mesh fine powder.

Green *robusta* coffee beans were par-baked at 320° F. for 12 minutes. The variety of *Coffea robusta* known as Cherry AB, imported from India, was used in this and in the following experimental examples with *robusta* coffee beans. For standardizing multiple tests, 100 g samples of green coffee beans were distributed in a monolayer on an aluminum mesh screen having 1 mm openings, where the edges of the screen were bent upward to form a carrier tray. The green beans and mesh tray were placed in a pre-heated controlled temperature oven. Oven temperature was monitored with a calibrated thermocouple thermometer (ThermoWorks 362B oven thermometer). Following par-baking, the beans were passively cooled in ambient air.

The par-baking process consistently removed 6% to 7% by weight moisture, leaving between 4% and 5% residual free moisture in the par-baked beans. When fully cooled to ambient temperature, the beans were milled in a conical burr-type coffee grinder (Breville model BCG800XL). The par-baked *robusta* beans were easily millable to both large and small (50-150 μm) particle sizes. Agtron values measured by the New England Coffee Company (Malden, Mass.) for these milled particles were typically greater than 99, such as, for example, 99.9. As in Example 1, CGA antioxidants were extracted into distilled water, and comparative UV spectral measurements of CGA levels were made for both large and small particles milled from the par-baked beans. These UV spectra were compared with similar spectra obtained for the same Cherry AB *robusta* beans that had not been par-baked, i.e., green *robusta* beans. Remarkably, all of the UV spectra including peak heights were essentially identical, indicating that the coffee beans experienced no measurable decrease in CGA content over the course of par-baking at 320° F. for 12 minutes, including the conical burr-milling process.

Example 3. Flavor Modification of Par-Baked and Milled Cherry AB *robusta* Beans Green *robusta* coffee beans were par-baked as in Example 2 and milled at the New England Coffee Company (NECC). The milled product was a fine and uniform particulate material suitable for combining with foods and beverages. The finely milled material ( ) contained a bimodal particle distribution with diameters centered around approximately 50 microns and approximately 150 microns. Initial flavor evaluation of the milled product by four individuals suggested that for addition to a wide variety of prepared foods, the product might be improved by addition of a limited amount of sweetener. Addition of between 5% and 10% by weight powdered confectioner's cane sugar provided favorable results. In another test formulation, 1 part by weight of either McCormick "Pure Almond Extract" or "Pure Vanilla Extract" was blended into 200 parts by weight of the par-baked and milled robust beans from NECC.

Example 4. Par-Baked and Finely Milled *Robusta* Particles Dispersed in Hot and Cold Beverages Varying amounts (1.1-5.5 g) of a sweetened *robusta* milled par-baked coffee bean powder similar to that of Example 3 (sweetened by addition of 1 part by weight confectioner's sugar per 10 parts of par-baked and milled beans) were mixed and dispersed in a single serving (approximately 250 mL) of each of a variety of different beverages. These included hot cocoa, orange juice, tomato juice, apricot nectar, and buttermilk. It was helpful to shake the container of beverage before serving to assure suspension of the powder particles, particularly with beverages such as orange juice having a limited viscosity.

Example 5. Par-Baked and Finely Milled *Robusta* Particles in Bakery Products

The par-baked, milled and sweetened *robusta* coffee bean powder of Example 3 was mixed into a white cake batter recipe (Betty Crocker Super Moist® white cake mix) prepared according to the package directions. Coffee material was added at a level of 5.5 g per 60 g of wet batter per muffin, and the batter was baked in paper muffin liners according to the package directions. The resulting muffins had a light and very pleasant flavor and texture with essentially the same amount of rise (volume expansion) during baking as the unsupplemented "control" muffins. The par-baked and milled coffee bean-containing muffins were judged to be commercially viable and adaptable for producing a variety of muffins according to different recipes. Muffin color was conservatively and acceptably altered from white (for the "control" muffins) to a light tan reminiscent of a light whole wheat bread color. Shelf life was not altered by addition of the milled par-baked beans. By contrast, addition of 5 g of finely milled traditional French roast coffee beans to the same batter recipe resulted in a muffin with a strong coffee flavor and dark chocolate-like appearance.

Example 6. Par-Baked and Finely Milled *Robusta* Particles in Hot Cereal

The par-baked, milled and sweetened *robusta* coffee bean powder of Example 3 was added to a hot oatmeal recipe (5.5 g of the coffee material per 40 g dry weight of Quaker Oats "Old Fashioned" oatmeal per serving). Mixing the par-baked and milled coffee bean material into the oatmeal both before and after cooking the recipe was tested. The resulting cooked oatmeals were slightly different, with slightly more crunch present when the coffee bean was added after cooking. The oatmeal flavor was mildly altered toward a slight nutty taste. As indicated, cooking the par-baked and milled coffee beans into the recipe reduced the amount of texture in the resulting cereal, while adding the material just before serving increased the amount of texture.

Example 7. Par-Baked and Finely Milled *Robusta* Particles in Soups, Dips, Dressings, and Condiments The par-baked, milled and sweetened *robusta* coffee bean powder of Example 3 was also successfully added by blending either of two amounts of the powder (2.2 g or 5.5 g) into single serving quantities of various soups (mixed vegetable and cream of mushroom, clam chowder), a dip (hummus), thick salad dressings (ranch, thousand island and blue cheese) and condiments (mustard and ketchup).

Example 8. Par-Baked and Milled *Robusta* Particles in Tea Bags

Coarse-milled particles of par-baked *robusta* coffee beans (0.4 mm-0.7 mm diameter particles) were prepared as in Example 3, but without any added sweetener. The size of these particles was selected to approximately match the size of (and thereby remain mixed with) other solid materials in tea bags. Between approximately 0.5 g and 1.0 g of these par-baked and coarsely milled particles were added per tea bag to provide between approximately 40 and 80 mg CGA antioxidants per cup of tea. The milled particles were combined and re-packaged with the approximate 1.5 g contents of a conventional commercial tea bag (Constant Comment® produced by R. C. Bigelow Inc., Fairfield, Conn.) and brewed for 5 minutes with boiling water according to the package directions. The tea was substantially similar in taste to a cup of otherwise identical tea that was not supplemented with the milled coffee beans.

Example 9. Blending Par-Baked Coffee Beans with Traditionally Roasted Coffee Beans Traditional roasting of coffee beans (typically at temperatures above 420° F.) for brewing coffee beverages produces complex and desirable flavor development in the coffee beans. Roasting also results in considerable oxidative loss of beneficial CGA antioxidants in the beans. By blending reduced temperature par-baked coffee beans containing high levels of CGA as described herein, together with traditionally roasted darker richly flavored coffee beans it is possible to obtain the benefits of both beans. That is, one beverage can simultaneously benefit from the flavor of traditionally roasted coffee beans combined with the high levels of CGA present in par-baked coffee beans. For example, a 50-50 blend of the par-baked and the traditionally roasted beans can achieve a balance between these benefits. Alternatively, if a lighter roasted flavor is desirable, accompanied by a higher level of CGA, then a 60-40 or a 70-30 blend including par-baked beans and roasted beans may be desirable.

Example 10. Commercial Par-Baking and Milling of Cherry AB *Robusta* Beans

Cherry AB *robusta* green coffee beans were par-baked and milled at the New England Coffee Company (Malden, Mass.) as in Example 3 using commercial equipment, except that a newly imported batch of the beans was utilized. Heating rate with natural gas in a horizontal drum coffee roaster was reduced to 50% of the full rate used with conventional coffee roasting to allow better control of the lower temperature par-baking process. With the drum preheated to 200° F., approximately 100 pounds of Cherry AB green coffee beans were introduced into the drum, resulting in the initial temperature decreasing to 143° F. Coffee bean temperature was then monitored continuously, and as the bean temperature rose above 250° F. the rate of temperature increase was measured to be approximately 0.5° F. per second. At 8 minutes into the par-baking process, the bean temperature reached 320° F. at which point the beans were removed from the drum and cooled with forced air (without water spray). Upon cooling to ambient temperature, residual moisture in the par-baked beans was measured and determined to be 4.2% by weight. Within 24 hours the beans were finely milled to a Turkish grind in a one-step, single pass operation using a roller-type mill.

The weight density of the green beans was measured using the protocol described previously herein and found to be 1.18 g/cm$^3$. This value is in excellent agreement with the 1.17 g/cm$^3$ value determined in Table 1. The density of the same beans following par-baking was determined to be 0.87 g/cm$^3$. This latter value compares with 0.98 g/cm$^3$ determined previously for par-baked Cherry AB beans (see Table 1). The difference is believed attributable to the mechanical and thermal differences involved in tumbling and heating 100 pounds of bulk green coffee beans in a commercial roaster for 8 min compared to heating approximately 1-3 ounces of beans distributed as a monolayer on a mesh screen for 12 min at 320° F.

The results of this experiment again demonstrated that par-baking green coffee beans according to methods described herein results in a significant decrease in the weight density of green coffee beans. In this instance, the decrease from 1.18 g/cm$^3$ to 0.87 g/cm$^3$ represents a 26% decrease in density, whereas small scale par-baking resulted in a 16% decrease in density (1.17 g/cm$^3$ decreasing to 0.98 g/cm$^3$). Both of these decreases are relatively small when compared with the 50% decrease in density that accompanies traditional roasting of coffee beans (1.17 g/cm$^3$ decreasing to 0.60 g/cm$^3$, see Table 1).

All patents and other references cited in the specification are incorporated by reference in their entireties.

As used herein, "consisting essentially of" does not exclude materials or steps that do not materially affect the basic and novel characteristics of the claim. Any recitation herein of the term "comprising", particularly in a description of components of a composition or in a description of elements of a device, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein.

What is claimed is:

1. A composition comprising comminuted par-baked coffee beans, obtained by a process comprising:
   (a) par baking whole green coffee beans in ambient air to a temperature from about 220° F. to about 360° F. for a time from about 5 minutes to about 120 minutes, wherein the combination of temperature and par-baking time is selected to avoid significantly diminishing the level of chlorogenic acid, such that the beans retain at least about 90% of their chlorogenic acid content from prior to par-baking and contain from about 5 wt % to about 15 wt % of chlorogenic acid, such that the beans attain a residual free moisture content from about 2 wt % to less than about 6 wt %, and such that the beans attain a weight density of about 0.75 to about 1.10 g/cm$^3$; wherein the par-backing conditions have been selected to substantially avoid the formation of products of Maillard reactions;
   (b) subsequently comminuting the par baked coffee beans by fragmentation into particles.

2. The composition of claim 1, wherein the beans prior to comminution have been par-baked in ambient air at a temperature of 220 to 250° F.

3. The composition of claim 1, wherein the beans prior to comminution have been par-baked in ambient air at a temperature of 250 to 280° F.

4. The composition of claim 1, wherein the beans prior to comminution have been par-baked in ambient air at a temperature of 280 to 310° F.

5. The composition of claim 1, wherein the beans prior to comminution have par-baked in ambient air at a temperature of 310 to 340° F.

6. The composition of claim 1, wherein the beans prior to comminution have a level of infrared reflectance measured at 800-890 nm wavelength of at least 90% of that prior to par-baking.

7. The composition of claim 1, wherein the par-baked beans are selected from the group consisting of *Coffea robusta*, *Coffea arabica*, and combinations thereof.

8. The composition of claim 1 that is decaffeinated.

9. The composition of claim 1, wherein the particles have an average diameter of less than 2 mm.

10. The composition of claim 1, wherein the particles have an average diameter of less than 1 mm.

11. The composition of claim 1, wherein the particles have an average diameter from 0.4 mm to 1.0 mm.

12. The composition of claim 1, wherein the particles have an average diameter from 0.7 mm to 0.4 mm.

13. The composition of claim 1, wherein the particles have an average diameter of less than 0.4 mm.

14. The composition of claim 5, wherein the particles have an average diameter of less than 0.2 mm.

15. The composition of claim 5, wherein the particles have an average diameter from 0.05 mm to 0.15 mm.

16. The composition of claim 1 that is provided in the form of a tablet, capsule, or powder.

17. The composition of claim 1 that is provided in the form of a solid, semi-solid, semi-liquid, or liquid composition, or in the form of an aqueous emulsion or suspension.

18. The composition of claim 1 that is provided in the form of a food composition, beverage composition, or nutritional supplement.

19. The composition of claim 1, wherein the par-baked beans have not undergone first crack expansion during par-baking.

\* \* \* \* \*